(12) United States Patent
Sasauchi et al.

(10) Patent No.: US 9,828,163 B2
(45) Date of Patent: Nov. 28, 2017

(54) HEAT-RESISTANT FOOD CONTAINER AND ITS MANUFACTURING METHOD

(71) Applicant: NAKAMOTO PACKS CO., LTD., Osaka (JP)

(72) Inventors: Katsuro Sasauchi, Osaka (JP); Shigeru Takaoka, Osaka (JP)

(73) Assignee: NAKAMOTO PACKS CO., LTD., Osaka-shi (JP)

( * ) Notice: Subject to any disclaimer, the term of this patent is extended or adjusted under 35 U.S.C. 154(b) by 192 days.

(21) Appl. No.: 14/124,633

(22) PCT Filed: Dec. 14, 2012

(86) PCT No.: PCT/JP2012/007993
§ 371 (c)(1),
(2) Date: Dec. 6, 2013

(87) PCT Pub. No.: WO2013/088728
PCT Pub. Date: Jun. 20, 2013

(65) Prior Publication Data
US 2014/0339124 A1   Nov. 20, 2014

(30) Foreign Application Priority Data
Dec. 16, 2011   (JP) ................................. 2011-276034

(51) Int. Cl.
*B29D 22/00* (2006.01)
*B65D 81/38* (2006.01)
(Continued)

(52) U.S. Cl.
CPC .......... *B65D 81/38* (2013.01); *B29C 47/0004* (2013.01); *B29C 47/0021* (2013.01);
(Continued)

(58) Field of Classification Search
CPC ...... C08L 67/02; C08L 23/0884; C08L 25/14; C08K 3/346; B29C 2791/006;
(Continued)

(56) References Cited

U.S. PATENT DOCUMENTS

2002/0111403 A1* 8/2002 Gosens ................... C08K 5/31
524/101
2003/0135015 A1   7/2003 Fujimaki et al.
(Continued)

FOREIGN PATENT DOCUMENTS

EP   2 365 018 A1   9/2011
JP   1-171515 A    7/1989
(Continued)

OTHER PUBLICATIONS

International Search Report dated Mar. 26, 2013, in PCT International Application No. PCT/JP2012/007993.
(Continued)

*Primary Examiner* — James Yager
(74) *Attorney, Agent, or Firm* — Birch, Stewart, Kolasch & Birch, LLP (57) ABSTRACT

This invention provides a food container which can be manufactured cheaply by using inexpensive general PET resin or further inexpensive PET resin for fiber or recovered PET flakes, and nevertheless, which has a high heat resistance up to 250° C., and the container is obtained by adding a chain extender and a compatibilizer and talc to PET resin, charging the mixture into an extruder 30 having two or more vent holes, degassing under a condition where the PET resin is melted with heating by sucking at a high vacuum of −99.99 kPa or lower from the vent holes 33, 34, thereafter, forming a sheet by extrusion molding, pressure-forming with vacuum the sheet by a thermoforming machine, forming the container by keeping in a mold at 100-220° C. The
(Continued)

Schematic View of Manufacturing Sheet container has a total of the content of crystal portion represented by the following formula and the content of talc being 25% by weight or more.

6 Claims, 3 Drawing Sheets

(51) Int. Cl.
| | |
|---|---|
| B29C 51/10 | (2006.01) |
| C08L 67/02 | (2006.01) |
| B29C 51/00 | (2006.01) |
| B29C 51/02 | (2006.01) |
| B29C 47/56 | (2006.01) |
| B29C 47/06 | (2006.01) |
| B29C 51/14 | (2006.01) |
| B29C 65/02 | (2006.01) |
| B65D 1/22 | (2006.01) |
| B29C 47/00 | (2006.01) |
| B29C 47/08 | (2006.01) |
| B29C 47/10 | (2006.01) |
| B29K 67/00 | (2006.01) |
| B29C 47/76 | (2006.01) |
| B29C 47/88 | (2006.01) |
| B29K 105/00 | (2006.01) |
| B29L 31/00 | (2006.01) |
| B29K 105/26 | (2006.01) |

(52) U.S. Cl.
CPC ...... *B29C 47/0054* (2013.01); *B29C 47/0064* (2013.01); *B29C 47/065* (2013.01); *B29C 47/56* (2013.01); *B29C 47/8805* (2013.01); *B29C 47/8845* (2013.01); *B29C 51/002* (2013.01); *B29C 51/02* (2013.01); *B29C 51/10* (2013.01); *B29C 51/14* (2013.01); *B29C 65/02* (2013.01); *B65D 1/22* (2013.01); *C08L 67/02* (2013.01); *B29C 47/0019* (2013.01); *B29C 47/0057* (2013.01); *B29C 47/0871* (2013.01); *B29C 47/0898* (2013.01); *B29C 47/1009* (2013.01); *B29C 47/1027* (2013.01); *B29C 47/767* (2013.01); *B29C 47/884* (2013.01); *B29C 2791/006* (2013.01); *B29K 2067/003* (2013.01); *B29K 2105/0005* (2013.01); *B29K 2105/0047* (2013.01); *B29K 2105/0085* (2013.01); *B29K 2105/0088* (2013.01); *B29K 2105/26* (2013.01); *B29K 2867/003* (2013.01); *B29L 2031/712* (2013.01)

(58) Field of Classification Search
CPC .............. B29C 51/10; B29K 2067/003; B29K 2105/0047; B29K 2867/003; B29L 2031/712; B65D 81/38
See application file for complete search history.

(56) References Cited

U.S. PATENT DOCUMENTS

| | | | |
|---|---|---|---|
| 2006/0142488 A1* | 6/2006 | Alms | C08L 67/02 |
| | | | 525/165 |
| 2008/0214699 A1* | 9/2008 | Halahmi | B29B 7/005 |
| | | | 523/222 |
| 2008/0299344 A1 | 12/2008 | Colhoun et al. | |
| 2009/0226117 A1* | 9/2009 | Davis | B29C 59/007 |
| | | | 383/5 |
| 2009/0246434 A1 | 10/2009 | Miyamoto et al. | |
| 2011/0221097 A1* | 9/2011 | Sasauchi | B32B 1/02 |
| | | | 264/331.21 |

FOREIGN PATENT DOCUMENTS

| | | | |
|---|---|---|---|
| JP | 2-68015 A | 3/1990 | |
| JP | 9-11419 A | 1/1997 | |
| JP | 2002-293977 A | 10/2002 | |
| JP | 2003-1719 A | 1/2003 | |
| JP | 2003-171539 A | 6/2003 | |
| JP | 2004-155176 A | 6/2004 | |
| JP | 2004-161967 A | 6/2004 | |
| JP | 2004-203977 A | 7/2004 | |
| JP | 2005-220238 A | 8/2005 | |
| JP | 2005-298595 A | 10/2005 | |
| JP | 2007-69622 A | 3/2007 | |
| JP | 2010-18694 A | 1/2010 | |
| JP | 2010-202775 A | 9/2010 | |
| JP | 2011-184580 A | 9/2011 | |

OTHER PUBLICATIONS

Extended European Search Report dated Jul. 29, 2015, in European Patent Application No. 12858328.3.

* cited by examiner

[Fig. 1]

Schematic View of Manufacturing Sheet

Effect of talc on crystallization speed of PET[44]

[Fig. 6]

HEAT-RESISTANT FOOD CONTAINER AND ITS MANUFACTURING METHOD

TECHNICAL FIELD

This invention relates to heat-resistant food containers, and more particularly, relates to heat-resistant food containers being resistant to 180-250° C. which is a cooking temperature in a multifunctional microwave oven.

BACKGROUND ART

In food shops in convenience stores, department stores, super markets, etc., foods, such as daily dishes, deep-fried dishes, noodles, and salads are placed in food containers, e.g. tray, cup or bowl, and sold. Heat resistance is required of these food containers to a temperature capable of being resistant to microwave oven heating for less oil content foods (90° C.), to a temperature capable of being resistant to microwave oven heating for abundant oil content foods (150° C.), or to a temperature capable of browning the top of gratin or Dria (180-250° C.). As the food containers having a heat resistance up to 90-150° C., containers having a four layer structure of A, B, C, D from the inside, wherein the heat resistance is imparted by using a PP layer containing 20-60% by weight of inorganic filler as the outermost D layer are proposed (see Patent Document 1), and techniques for fabricating a resin composition composed of 40-80% by weight of a mixture of 10% by weight or more of PP resin and PE resin and 20-60% by weight of talc are also proposed (see Patent Document 2). However, since the main body of the containers formed by these techniques is PP resin having a melting point of around 160° C., they cannot be used as a container having a heat resistance up to 250° C. for handling gratin etc.

As the container having a heat resistance up to 180-250° C., in general, molded containers using C-PET resin (crystallization accelerator is added.) are applied.

Moreover, a container for oven capable of handling −40° C.-250° C. is proposed formed of a mixture of 100 parts by weight of all aromatic polyester composed of a repeating unit of:

[Chemical 1]

and forming an optically anisotropic fused phase, filled with 25-500 parts by weight of an inorganic compound (see Patent Document 3).

In addition, a method of manufacturing a sheet for food containers is proposed utilizing undried recovered PET flakes (see patent Document 4), but this sheet for food containers is not heat-resistant.

PRIOR ART DOCUMENT

Patent Document

Patent Document 1: JP9-11419 A
Patent Document 2: JP2-68015 A
Patent Document 3: JP1-171515 A
Patent Document 4: JP2011-184580

SUMMARY OF THE INVENTION

Problems to be Solved by the Invention

However, in the case of the containers molded by using the aforementioned C-PET resin, since the C-PET resin itself is expensive, the containers are also expensive. With respect to the containers molded by using the aforementioned all aromatic polyester, the all aromatic polyester resin must be newly synthesized, and therefore, they are expensive. As mentioned above, conventional food containers having heat resistance up to 250° C. and capable of being resistant to cooking with heating by a multifunctional microwave oven are all expensive.

The object of the invention is to solve the above problems, and to provide a food container which can be manufactured cheaply by using inexpensive general PET resin or further inexpensive PET resin for fiber or recovered PET flakes, and nevertheless, which has a high heat resistance up to 250° C.

Means for Solving Problems

The inventors investigated eagerly, and as a result, they have found that heat resistance to 180-250° C. for a multifunctional microwave oven can be imparted by mixing a chain extender which binds terminals of PET resin chain, talc and a compatibilizer for PET resin and talc, with inexpensive general PET resin, PET resin for fiber, recovered PET flakes, etc., charging the mixed resin into an extruder having a vent hole, degassing the mixed resin in melted condition with heating by sucking at a high vacuum of −99.99 kPa or lower from the vent hole, thereafter, rendering the raw PET resin higher molecular weight by the chain extender without drying, then, extrusion-molding it into sheet by a thermoforming machine, keeping it in the mold at 100-220° C. to crystallize the PET resin to render the total content of the crystal portion of the PET resin and talc 25% by weight or more, and thereby, the present invention has been completed.

Thus, the heat-resistant food container in accordance with the invention is configured by adding a chain extender and a compatibilizer and talc to PET resin, charging the mixture into an extruder having two or more vent holes, degassing under a condition where the PET resin is melted with heating by sucking at a high vacuum of −99.99 kPA or lower from the vent holes, thereafter, forming a sheet by extrusion molding, pressure-forming with vacuum the sheet by a thermoforming machine, forming the container by keeping in a mold at 100-220° C., and the container having a total of the content of crystal portion represented by the following formula and the content of talc being 25% by weight or more.

$$\text{crystal portion (\%)} = \frac{\text{heat quantity of fusion per mole} - \text{heat quantity of cold crystallization per mole}}{\text{heat quantity of fusion per mole}} \times 100 \quad \text{[Mathematical 1]}$$

of perfect crystal of PET (26.9 KJ)

In an aspect of the heat-resistant food container of the invention, the chain extender has three or more epoxy groups, said compatibilizer is ethylene/acrylic acid/glycidyl methacrylate copolymer, and added amount of the talc is 2-15% by weight.

In another aspect of the heat-resistant food container of the invention, an inside layer being a PET resin layer is formed by coextrusion.

In another aspect of the heat-resistant food container of the invention, an outside layer being a printed film of an A-PET film or a stretched A-PET film 1.5-2.5 times in the MD direction provided with gravure printing is formed by thermal lamination.

A method of manufacturing an aspect of the heat-resistant food container of the invention comprises adding a chain extruder having three or more epoxy groups, a compatibilizer being ethylene/acrylic acid/glycidyl methacrylate copolymer and 2-15% by weight of talc to a PET resin becoming a main layer, charging the mixture into a main extruder having two or more vent holes, and charging a PET resin becoming an inside layer into a subsidiary extruder having one or more vent holes, degassing in a condition where each of the PET resins are melted with heating by sucking at a high vacuum of −99.99 kPa or lower from the vent holes, thereafter, forming the main layer and the inside layer by coextrusion, laminating an outside layer being a printed layer of an A-PET film or a stretched A-PET film 1.5-2.5 times in the MD direction provided with gravure printing to the main layer by thermal lamination, pressure-forming with vacuum the laminated sheet comprising the inside layer, the main layer and the outside layer by a thermoforming machine, and keeping in a mold at 100° C.-220° C.

Effects of the Invention

The heat-resistant food container of the invention is formed of a resin composition of a PET resin, and a chain extender and a compatibilizer and talc added thereto. By adding a chain extender to a PET resin, terminals of low molecular weight PET molecules are bonded to modify it into high molecular weight PET resin having three-dimensional structure, and as a result, even the resins which cannot be extrusion-molded due to their low melt tension, such as PET resins for fiber and recovered PET flakes, their melt tension can be raised to render their extrusion molding possible. Moreover, by incorporating talc, heat resistance of the container can be improved, and by incorporating a compatibilizer, talc can be mixed and dispersed uniformly into the PET resin.

Since the sheet is formed by charging the resin composition composed of the above PET resin into an extruder having two or more vent holes, degassing in a condition where the PET resin is melted with heating by sucking at a high vacuum of −99.99 kPa or lower, and then extrusion-molding, the PET resin can be used without drying. Thereby, manufacturing cost can be decreased. Especially, even in the case of recovered PET flakes, since they can be used without drying, the sheet can be manufactured cheaply.

Furthermore, since the sheet formed by extrusion molding is molded by pressure-forming with vacuum by a thermo-forming machine, followed by keeping in a mold at 100-220° C., the crystallinity can be increased. As a result, since a total of the content of crystal portion and the content of talc becomes 25% by weight or more, the container has a heat resistance up to 250° C. Therefore, heating capable of browning the top of gratin is possible by using a multifunctional microwave oven.

In an aspect of the heat-resistant food container of the invention, since the chain extender has three or more epoxy groups, a terminal of PET molecules can be bound to the epoxy group to molding efficiently into a high molecular weight PET resin having three dimentional structure. Moreover, since the compatibilizer is ethylene/acrylic acid/glycidyl methacrylate copolymer which has affinity for both the PET resin and talc, they can be mixed into extremely uniform dispersion to prevent formation of lumps of talc almost completely. Furthermore, since the added amount of talc is 2-15%, heat resistance is ensured by the talc itself. The talc also acts a crystal nucleator for PET to accelerate crystallization, and crystallization can be accelerated up to lower temperature than pure PET.

In another aspect of the heat-resistant food container of the invention, since an inside layer being a PET resin layer is formed by coextrusion, even when recovered PET flakes are used as raw material for the main layer, high safety and sanitation can be ensured by forming the inside layer by virgin PET resin. Therefore, it can be used as a food container without problems.

In another aspect of the heat-resistant food container of the invention, since an outside layer being a printed film of an A-PET film or a stretched A-PET film 1.5-2.5 times in the MD direction provided with gravure printing is formed by thermal lamination, beautiful makeup property can be imparted to the appearance of the container.

In a method of manufacturing an aspect of the heat-resistant food container of the invention, since adding a chain extender having three or more epoxy groups, a compatibilizer being ethylene/acrylic acid/glycidyl methacrylate copolymer and 2-15% by weight of talc to a PET resin becoming a main layer, charging the mixture into a main extruder having two or more vent holes, and charging a PET resin becoming an inside layer into a subsidiary extruder having one or more vent holes, degassing in a condition where each of the PET resins are melted with heating by sucking at a high vacuum of −99.99 kPa or lower from the vent holes, thereafter, forming the main layer and the inside layer by coextrusion, laminating an outside layer being a printed layer of an A-PET film or a stretched A-PET film 1.5-2.5 times in the MD direction provided with gravure printing to the main layer by thermal lamination, pressure-forming with vacuum the laminated sheet comprising the inside layer, the main layer and the outside layer by a thermoforming machine, and keeping in a mold at 100° C.-220° C., the above heat-resistant food container can be manufactured easily.

As a result, a heat-resistant food container can be manufactured inexpensively which is excellent in the heat-resistance up to 250° C., safety and sanitation, beautiful make-up property.

MODE FOR CARRYING OUT THE INVENTION

In the heat-resistant food container of the invention, first, PET resin material is prepared by adding the chain extender, talc and the compatibilizer to the PET resin and mixing them. The PET resin is virgin PET resin, PET resin for fiber, recovered PET flakes, and the like, and although not particularly limited thereto, PET resin for fiber, recovered PET flakes and the like are preferred, because of manufacturing more inexpensively.

The chain extender binds terminals of low molecular weight PET molecules to modify them into a high molecular weight PET resin having three-dimensional structure. As the chain extender, it is necessary to have three or more epoxy groups in one molecule, and its reactivity increases with increasing the number of epoxy groups. Such a chain extender includes high activity styrene-acryl oligomer having 9-10 epoxy groups in one molecule (ADR4368S", Mn=3,000, BASF Japan Ltd.) and the like.

The blending amount of the chain extender may be determined according to the instructions of each company depending on the performance of respective chain extenders being sold, and in the case of the above "ADR4368S", it is 0.5% by weight of PET resin. In the case of recovered PET flakes of which the intrinsic viscosity of PET resin is lower than 0.6, the blending amount is more than 0.5% by weight. When the intrinsic viscosity is higher than 0.6, the blending amount is less than 0.5% by weight. Like this, when the blending amount is small, a masterbatch (hereinafter referred to as "MB") is made by blending 20-40% by weight of the chain extender with PET resin, and may be added in a form of MB.

Talc improves heat resistance and also acts as a nucleating agent to accelerate crystallization speed to improve heat resistance up to 250° C. in cooperation with the crystallized portion of PET resin.

Figure 5:
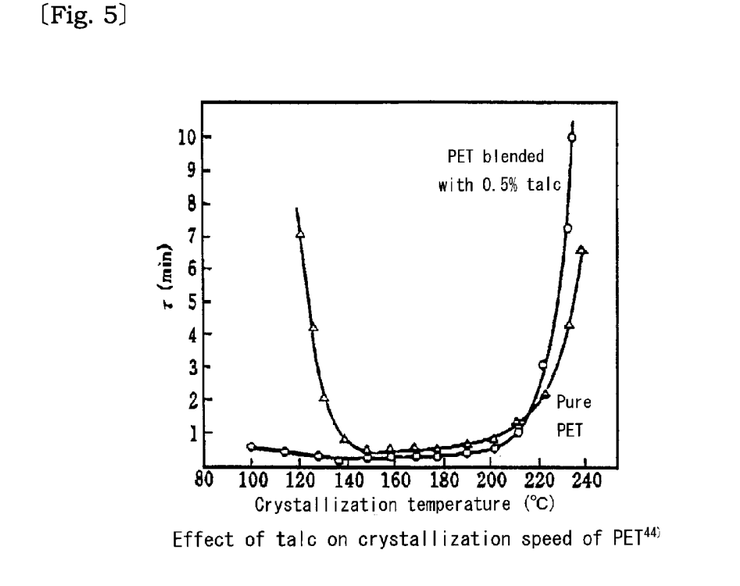
FIG. 5 A drawing showing the effect of talc on the crystallization speed of PET.

FIG. 5 represents a crystallization speed of PET, when blending 0.5% by weight of talc (against PET). The abscissa indicates crystallization speed, and the ordinate indicates semicrystallization time. From the figure, the crystallization speed of PET blended with 0.5% talc is about 1.5 times faster than pure PET even in the closest range at 150-160° C., and in a temperature range lower than 150° C., the difference increases. Therefore, crystallization can be accelerated until lower temperature side than pure PET.

In general, instances reporting the reaction mechanism of blended nucleating agent are few, and there are a theory that PET is adsorbed onto the nucleating agent to increase the trans-conformation of molecular chain, and a theory of chemical nucleation by the reaction of the nucleation agent with PET.

Talc acts as a nucleating agent, and also plays a role of the improvement in heat resistance and rigidity. That is, PET is composed of non-crystal portion and crystal portion, and at a temperature higher than the glass transition temperature (around 70° C.), the non-crystal portion is gradually softened with elevating the temperature similar to glass, and thereby, resistance to deformation is weakened. Whereas, the crystal portion is solid until melted at the melting point (260° C. for PET), and resistance to deformation is not weakened. Talc is an inorganic material, and is solid even at 260° C. Therefore, talc acts similar to the crystals of PET, and both improve heat resistance in cooperation with each other. When talc is blended, the structure is that, islands of the crystal of PET and talc which are solid are present in the sea of the non-crystal portion of PET. Then, when the non-crystal portion is softened by elevating the temperature exceeding the glass transition temperature, if there are the crystal portion and talc being solid abundantly, the distance between solid matters is close to each other. Then, the PET resin can resist to deformation, because solid does not deform. Thus, the heat resistance is improved.

A suitable blending amount of talc is 2-15%, preferably 3-10% by weight of PET.

Then, the total content of the content of crystal portion represented by the following formula and the content of talc of the container is finally rendered 25% by weight or more of the total weight of the container. By rendering the total content 25% by weight or more, heat resistance up to 250° C. can be ensured.

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100 \qquad \text{[Mathematical 1]}$$

Figure 6:
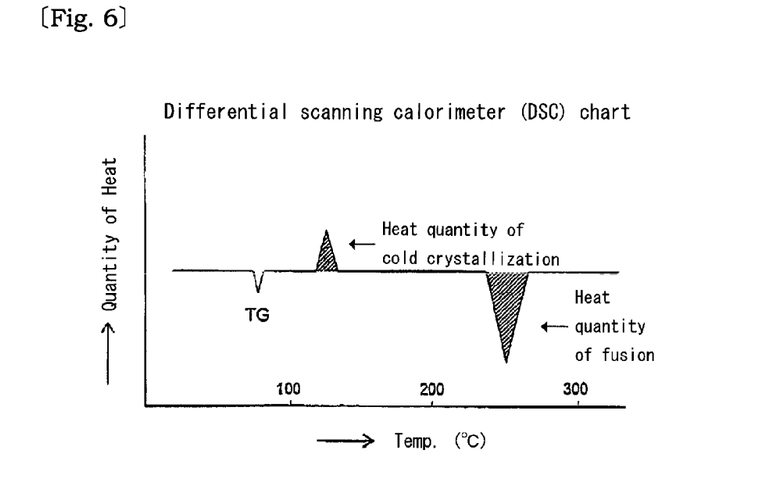
FIG. 6 A drawing showing a curve measured by a differential scanning calorimeter.

Respective heat quantities can be determined from the curve, for example, schematically illustrated in FIG. 6.

Preferred talc has a mean particle size of 20 μm or less, more preferably 10 μm or less. When the mean particle exceeds 20 μm, dispersion is degraded to decrease the number acting as the nucleating agent, even if the blending amount is the same. Although the lower limit is not particularly restricted, in general, up to 0.5 μm is practical.

Since talc is powder, handling is troublesome, and it is difficult to disperse uniformly, resulting in the production of lumps in PET resin. Therefore, it is preferable to blend in a form of MB with polyethylene (PE) resin. A preferred MB of talc is in a high concentration blended with 50-80% by weight of talc. Because the PE resin is a foreign matter for PET resin, the amount of the PE resin can be decreased by rendering the high concentration, and thereby, properties of PET resin can be less impaired.

The compatibilizer is blended in order to disperse talc uniformly into PET resin. That is, it is preferable that talc is added in a form of MB. Since the compatibilizer compatibilizes PET resin and PE resin, it can compatibilize talc with PET resin to disperse it into the PET resin uniformly. Accordingly, a preferable compatibilizer is ethylene/acrylic acid/glycidyl methacrylate copolymer which is a compatibilizer for polyester and olefin.

The blending amount of the compatibilizer is determined according to the instructions of each company, and for example, in the case of "LOTADER (registered trademark) AX8840" sold by ARKEMA company, it may be 4% by weight or less of the total weight. Although the lower limit is not particularly restricted, in general, it is up to 1% by weight.

The uniformly dispersed and mixed PET resin materials as above is charged into an extruder having two or more vent holes, and degassed under a condition where the PET resin is melted with heating, by sucking at a high vacuum of −99.99 kPa (gauge pressure) or lower from the vent holes. Thereafter, a sheet is formed by the extrusion molding.

Like this, by the extrusion molding after degassing in an extruder, since the sheet can be formed without passing through a drying process, the cost can be decreased. That is, in general, when a PET resin containing moisture is extruded by an extruder, since hydrolysis occurs to degrade the PET resin. Therefore, the PET resin must be dried usually up to 50 ppm or less. The drying is carried out at a temperature of 120-140° C., and according to the moisture content, the drying time is several hours for virgin PET resin, and 10 and several hours for recovered PET flakes. As a result, the drying requires massive energy cost to elevate the total cost. Accordingly, since undried PET resin or recovered PET flakes, etc. can be used as is without drying process, the cost for requiring drying process can be saved.

Subsequently, the sheet is pressure-formed with vacuum by a thermoforming machine, followed by keeping it at a temperature of 100-220° C. in a mold to form a container. That is, the sheet is heated to a temperature of 80-130° C., formed into the container by vacuum or vacuum-pressure forming using a thermoforming machine, and keeping it at a temperature of 100-220° C., preferably 120-200° C. for 3-10 seconds in the same mold, and then taking out the container. The mold may be a usual mold composed of a female mold and a plug assist or a matched mold composed of a female mold and a male mold having similar figures. In the case of the matched mold, the time until taking out the container can be shortened by rendering either the female mold or the male mold a heating mold, and rendering the other a cooling mold, and first, the crystallization of PET is accelerated by the heating mold, and then, cooling by the cooling mold.

For example, when the male mold is used as a heating mold, the vacuum port of the male mold is evacuated, and a container is formed by blowing pressure air from the female mold being a cooling mold. Then, the formed container is heated to keep at a temperature of 100-220° C. for a prescribed time while the container is in intimate contact with the male mold to accelerate crystallization. Subsequently, pressure air is blown from the vacuum port of the male mold, and the container is cooled with pressing the container to the female mold by evacuating the vacuum port of the female mold.

When the female mold is used as a heating mold the vacuum port of the female mold is evacuated, and a container is formed by blowing pressure air from the vacuum port of the male mold. Then, the formed container is heated to keep at a temperature of 100-220° C. for a prescribed time while the container is in an intimate contact state to accelerate crystallization. Subsequently, the vacuum port of the male mold is evacuated, and the container is cooled with pressing the container to the male mold by blowing pressure air from the vacuum port of the female mold.

As mentioned above, by keeping the container at a temperature of 100-220° C. in the mold, the crystal portion of the container is made 25% by weight or more, preferably 25-40% by weight as the total weight with talc.

In addition, the container may be formed of the PET resin layer alone composed of PET resin blended with the chain extender, compatibilizer and talc, and may also be formed of the PET resin layer as the main layer and a virgin PET resin layer as an inside layer located on the inside (the side in contact with foods). By forming the inside layer, even when recovered flakes or the like are used as the PET resin for the main layer, extremely high sanitation can be ensured. The inside layer can be formed simultaneously with the formation of the main layer by applying the coextrusion process. In addition, by using a subsidiary extruder having one or more vent holes, and extruding undried PET resin with sucking to degas from the vent holes, the drying process can be omitted, and thereby, manufacturing cost of the inside layer can be decreased. A preferred thickness of the inside layer is 25-50 μm. A suitable ratio to the main layer is about 2.5-10% of the total thickness of the main layer+the inside layer.

Furthermore, a printed layer of an A-PET film or a stretched A-PET film stretched 1.5-2.5 times in the MD direction provided with gravure printing may be formed as an outside layer of the PET resin layer composed of a PET resin blended with the chain extender, the compatibilizer and talc. By forming the outside layer, beautiful make-up property of the surface of the container can be improved. The outside layer can be formed by laminating to the PET resin layer by the thermal lamination upon extrusion-molding the PET resin layer, simultaneously.

Subsequently, a manufacturing apparatus will be explained for the sheet for the heat-resistant food container according to the invention.

Figure 1:
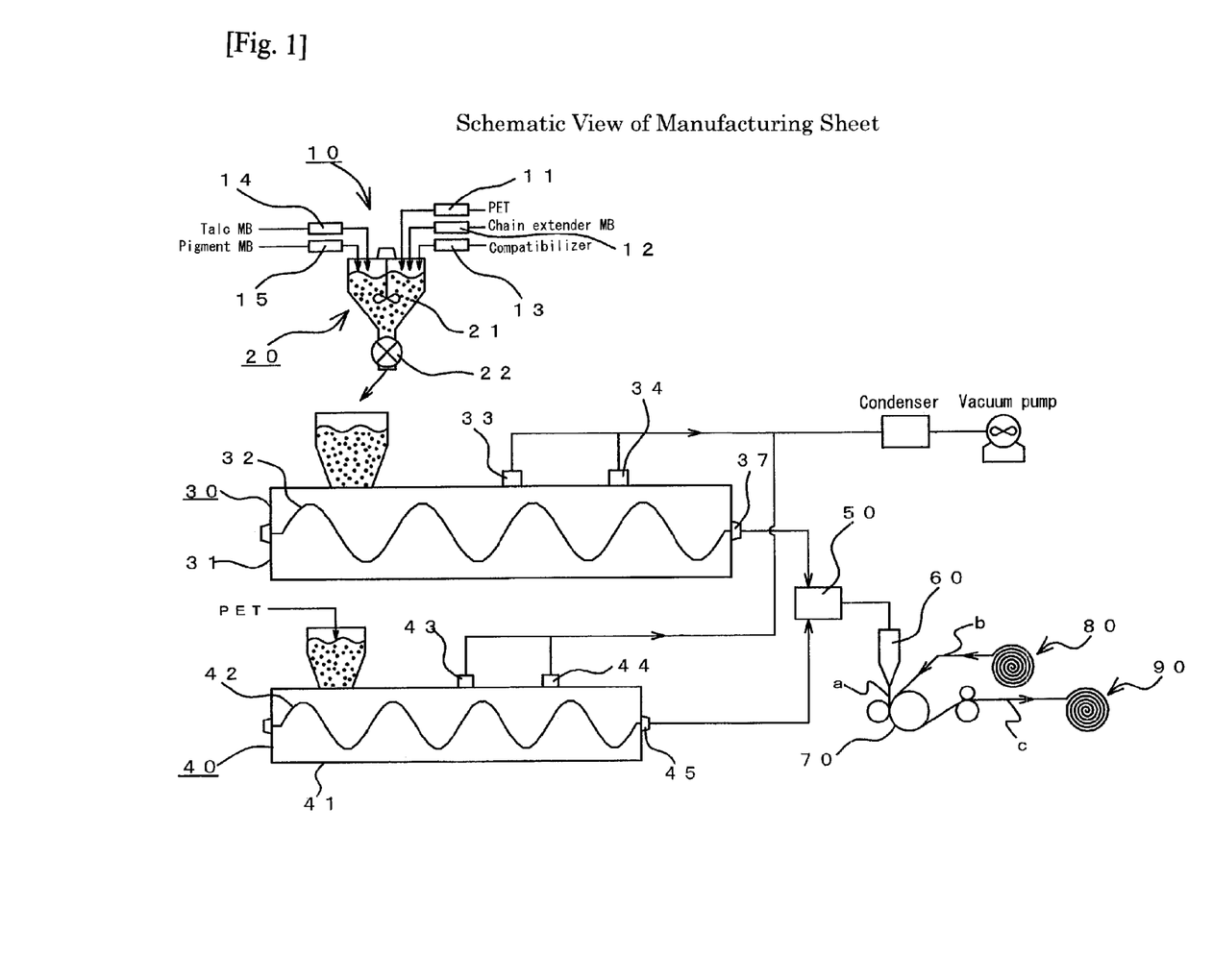
FIG. 1 A schematic view of a manufacturing apparatus for the sheet for the heat-resistant food container.
Figure 2:
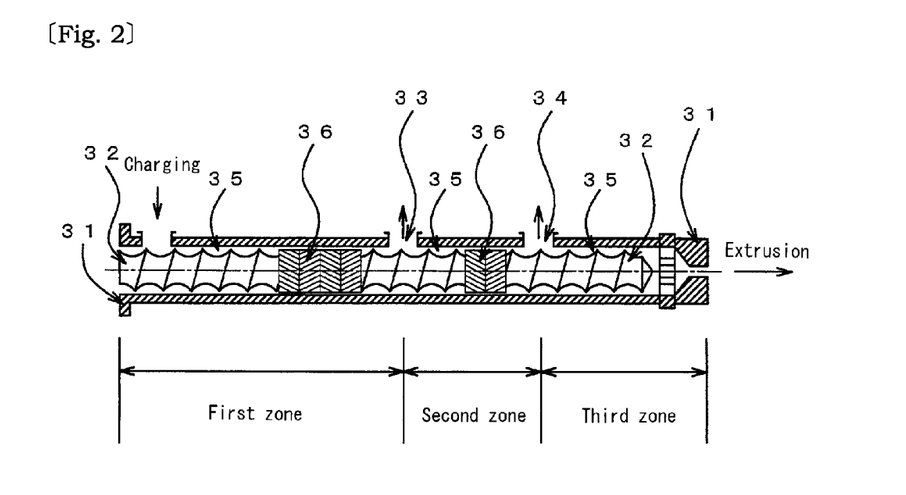
FIG. 2 A schematic illustration of the cylinder portion of an extruder used for the manufacturing apparatus for the sheet for the heat-resistant food container.
Figure 3:
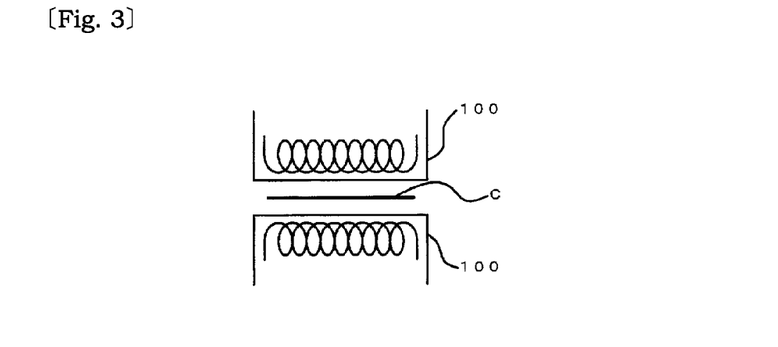
FIG. 3 A schematic illustration of a heating portion of heating the laminated sheet.
Figure 4:
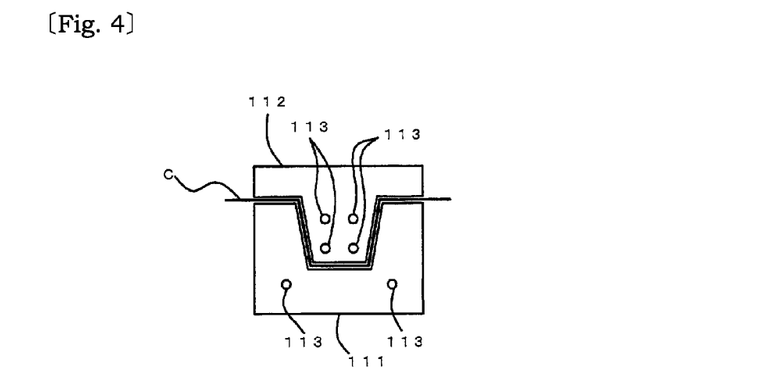
FIG. 4 A schematic illustration of a thermoforming machine.

FIG. 1 is a schematic view of a manufacturing apparatus for the sheet for the heat-resistant food container, FIG. 2 is a schematic illustration of the cylinder portion used for the manufacturing apparatus for the sheet for the heat-resistant food container, FIG. 3 is a schematic illustration of a heating portion for heating the laminated sheet, and FIG. 4 is a schematic illustration of a thermoforming machine.

In FIG. 1, 10 indicates gravimetric/volumetric feeders, 20 is a mixer, 30 is a main extruder, 40 is a subsidiary extruder, 50 is a feed block, 60 is a T die, 70 is a cooling roll, 80 is a printed film delivery roll and 90 is a take-up roll. The above gravimetric/volumetric feeders 10 are constructed by a feeder 11 for the PET resin, a feeder 12 for the chain extender, a feeder 13 for the compatibilizer, a feeder 14 for talc and a feeder 15 for pigments, and each feeder is arranged so as to charge a prescribed amount into the mixer 20. The mixer 20 is constructed by the body 21 and a rotary valve 22 located at the lower end, and the materials charged from the gravimetric/volumetric feeders 11, 12, 13, 14, 15 are mixed uniformly in the body 21 to prepare a PET resin material, and supplies a prescribed volume at a time to the main extruder 30 by the rotary valve 22. In the main extruder 30, the charged PET resin material is heated to melt, sucked to degas at a high vacuum of −99.99 kPa or lower from the vent holes, and then, extruded.

A schematic illustration of the cylinder portion of the main extruder 30 is shown in FIG. 2. In FIG. 2, 31 is a cylinder provided with a screw 32 therein, and a first vent hole 33 and a second vent hole 34 are formed from the base end (resin-charging side). The screw 32 is divided into compression portions 35 and seal portions 36, alternately. In the seal portions 36, the channel width of the screw is narrowed to fill the space with the molten PET resin, and the pressure difference is sealed between the back pressure of 100-200 kg/cm$^2$ at the compression portion 35 and the high vacuum of −99.99 kPa at the vent holes 33, 34. The resin is forced to move forward only by the rotation of the screw 32, and thereby, blown up of the molten PET resin is prevented from the vent holes 33, 34.

The vent holes 33, 34 are connected to an oil-sealed rotary vacuum pump through a condenser, and the condenser is to maintain the degree of vacuum and the quality of the oil of the oil-sealed rotary vacuum pump. If the condenser is not provided, for example, when a PET resin having a moisture content of 3,000 pp, is operated at a discharge amount of 500 kg/hr, high vacuum cannot be maintained by the generation of water vapor at a rate of 500,000 g×0.3/100=1,500 g/hr, to deteriorate the oil in the oil-sealed rotary vacuum pump by the contamination with water.

When PET resin is melted and extruded by using the above extruder, the PET resin is charged into the cylinder 31, and extruded at an extrusion temperature around 280° C., at a back pressure of 100-200 kg/cm$^2$ with sucking to degas from the vent holes 33, 34 at a high vacuum of −99.99 kPa or lower.

The charged PET resin is, first, in the first zone, heated to melt, and kneaded with the blended MB of the chain extender, the compatibilizer and the MB of talc. It is considered that depolymerization of the melted PET occurs by the hydrolysis or thermal decomposition caused by the water and heat to generate low-molecular PET chains, ethylene glycol and acetaldehyde. However, since the chain extender is blended, it is considered that the low-molecular PET chains are bonded together to generate a high molecular weight with three-dimensional structure and polymerization reaction with trapping ethylene glycol or acetaldehyde. That is, epoxy group

[Chemical 2]

is clove to bind to a functional group, such as carboxyl group (—COOH), aldehyde group (—CHO) or hydroxyl group (—OH), and forms PET molecular chains into a high polymer molecule having a three dimensional net structure. Further, ethylene glycol produced by depolymerization and acetaldehyde produced from ethylene glycol are trapped as a part of the high polymer molecule. Since saturated vapor pressure of the moisture contained therein is 65 kg/cm$^2$ at 280° C., the moisture is in a state of liquid at a back pressure of 100 kg/cm$^2$ or higher.

When the molten PET resin containing ethylene glycol, acetaldehyde and water reaches the first vent hole 33, ethylene glycol (b.p. 198° C.), acetaldehyde (b.p. 20° C.) and water (b.p. 100° C.) are evaporated by the high vacuum of −99.99 kPa or lower, and sucked to degas from the first vent hole 33. The remaining ethylele glycol, acetaldehyde and water not sucked from the first vent hole 33 are sucked to degas from the second vent hole 34. In the second zone, it is considered that, although depolymerization also occurs partly, the polymerization reaction by the chain extender occurs in the most part.

In the third zone, since only polymerization reaction by the chain extender occurs mostly, additional acetaldehyde does not generate, the molten PET resin is extruded in the state of free acetaldehyde.

In this manner, since it can be modified to three dimensional high molecular weight by the polymerization reaction, not only conventional PET resins used for bottles or containers but also cheap PET resin for fiber and recovered PET flakes can be utilized by the modification.

In addition, almost similar to the main extruder 30, the subsidiary extruder 40 is also provided with a cylinder 41, a screw 42, a first vent hole 43, a second vent hole 44, compression portions (not illustrated) and seal portions (not illustrated), and moisture is removed from the charged PET resin in almost similar processes.

Extrusion ports 37, 45 of the main extruder 30 and the subsidiary extruder 40 are connected to the T die 60 through a feed block 50, and a laminated sheet consisting of a main layer and an inside layer is formed by coextrusion of the PET resin supplied from the main extruder 30 and a virgin PET resin supplied from the subsidiary extruder 40 through the T die 60. On this occasion, a printed film b is delivered from the printed film delivery roll 80, and superimposed onto the main layer of the laminated sheet a, and laminated thereto as the outside layer by the thermal lamination. Then, the laminated sheet c consisting of the inside layer, the main layer and the outside layer is wound on the take-up roll 90.

Subsequently, the laminated sheet thus formed is molded into a container. As shown in FIG. 3, the laminated sheet c is heated by heaters 100, and then, molded into the container by the thermoforming machine as shown in FIG. 4. In FIG. 4, 111 is a female mold, 112 is a male mold, and heaters 113 are buried in the female mold 111 and in the male mold 112. In addition, a great number of vacuum ports (not illustrated) are formed on the female mold 111, and a great number of vacuum pressure air ports (not illustrated) are formed on the male mold 112.

Heat-resistant clear containers are manufactured by the thermoforming machine as above. A laminated sheet c is introduced into the thermoforming machine, and molded into a container shape by sucking the laminated sheet c from the vacuum•pressure air ports of the male mold 112 to be adsorbed on the male mold 112. It is kept in this state for a while to be thermoset, and then, the container is pressed to be in contact with the female mold 111 by blowing pressure air from the vacuum•pressure air ports to cool the outside of the container.

Examples 1

[Preparation of PET Resin Material]

83 parts by weight of PET resin (manufactured by Unitika Ltd., "MA-2101M", intrinsic viscosity: 0.62 dl/g, moisture content: 2,900 ppm), 10 parts by weight of talc MB (manufactured by Tokyo Printing Ink Mfg. Co., "PEX 1470", 30% by weight of LDPE+70% by weight of talc), 1 part by weight of chain extender MB (Meisei Kagaku Co., Ltd., prototype, 70% by weight of PETG+30% by weight of "ADR 4368S" manufactured by BASF Japan Ltd.), 4 parts by weight of white pigment MB (manufactured by Dainippon Ink and Chemicals, Inc., "L9583", 50% by weight of PET+50% by weight of white pigment) and 2 parts by weight of compatibilizer (manufactured by ARKEMA Company, "LOTADER AX 8840") were weighed by a gravimetric type feeder, and mixed them uniformly by a mixer.

[Preparation of Laminated Sheet]

The PET resin material (for the main layer) was charged into a main extruder (manufactured by Japan Steal Works, Ltd., "TEX 1052", L/D=31.5, twin-screw, two vent holes), and extruded at an extrusion temperature of 280° C. with sucking to degas at a high vacuum of −101 kPa through the vent holes, and simultaneously, PET resin (for the inside layer, manufactured by Unitika Ltd., "MA-2101M", intrinsic viscosity: 0.62 dl/g, moisture content: 2,900 ppm) was charged into a subsidiary extruder (manufactured by Japan Steal Works, Ltd., "TEX 652", L/D=31.5, twin-screw, two vent holes), and extruded at an extrusion temperature of 280° C. with sucking to degas at a high vacuum of −101 kPa through both vent holes to form a laminated sheet consisting of the main layer and the inside layer by the coextrusion from a T die.

At the same time, a printed film (for the outside layer), which was an A-PET film 30 μm in thickness printed with a cooked gratin pattern and instructions in letters, was delivered, and superimposed on the outside of the main layer of the coextrusion resin layer (main layer/inside layer) coextruded from the T die. They were laminated by thermal lamination to produce a laminated sheet of outside layer (30 μm)/main layer (300 μm)/inside layer (30 μm) 360 μm in total thickness.

<Behavior of Moisture>

The screw and the suction with vacuum in continuous extrusion were temporarily stopped, and resins located at the position of the first vent hole and the second vent hole of the main extruder and the subsidiary extruder respectively were taken as samples. The moisture contents of them were measured by using a moisture vaporizer for plastics (manufactured by Kyoto Electronics Manufacturing Co., Ltd., "ADP-351 type") and a Karl Fischer moisture meter (manufactured by Kyoto Electronics Manufacturing Co., Ltd., "MKC-210 type"), and the results are shown in Table 1.

TABLE 1

| Extruder | Position | | |
|---|---|---|---|
| | Before charging | First Vent Hole | Second Vent Hole |
| Main Extruder | 2,900 ppm | 7 ppm | 0 ppm |
| Sub-Extruder | 2,900 ppm | 7 ppm | 0 ppm |

The moisture content of the resin in the main extruder and the resin in the subsidiary extender containing a large quantity of moisture before charging were decreased to 10 μm or less at the position of the first vent hole which passes the criterion of 50 ppm or less required upon the extrusion of conventional PET resins. At the position of the second vent hole, the moisture content became 0 ppm, and it can be seen that previous drying does not need because of sucking to degas from the vent holes.

[Evaluation of Residual Acetaldehyde]

The aforementioned laminated sheet was cut into a size of 1 cm×2 cm to prepare cut pieces of food trays, and a large number of the cut pieces corresponding to surface area of 250 m² in total of the inside and the outside were placed in a 500 ml Erlenmeyer glass flask with a ground stopper. Then, after replacing the air in the Erlenmeyer flask by $N_2$ gas at 40° C. (2 ml $N_2$ gas/1 cm² surface area) in a room at 40° C., the flask was sealed by the ground stopper, and allowed to stand at 40° C. for 24 hours.

Acetaldehyde in the vapor phase in the Erlenmeyer flask so treated was measured by the gas chromatograph (manufactured by Shimazu Corporation, "GC-6A type" with a FID detector), and the results are shown in Table 2.

TABLE 2

| Detector of acetaldehyde by the gas chromatograph | |
|---|---|
| Sample | Quantity of acetaldehyde |
| Vapor phase in the Erlenmeyer flask | 0 μg/l |

Acetaldehyde was not detected by the gas chromatograph. Accordingly, it was confirmed that residual acetaldehyde was not present.

[Molding of Heat-Resistant Food Container]

Using a vacuum•pressure forming machine (manufactured by Wakisaka Engineering Co., Ltd., "FVS-5000P"), the mold was made so that the female mold and the male mold have a similar form with a space of 1.0 mm therebetween. Both of the female mold and the male mold were provided with vacuum•pressure ports of 0.7 mm, and thereby, were made possible to suck and to blow pressure air by changing between vacuum and pressure air. As to the form of the mold, the female mold had a top diameter of 128 mmΦ, a bottom diameter of 95 mmΦ and a depth of 35 mm, and the bottom corners were rounded into an R form.

The laminated sheet prepared as above was heated to be softened by a heater so that the surface temperature was made 130° C. The temperature of the female mold was set at 170° C., and the male mold at 70° C. Under the conditions, the vacuum•pressure air ports of the female mold were set to vacuum, and the vacuum•pressure air ports of the male mold were set to pressure air to blow pressure air at 0.5 MPa, and thereby, the laminated sheet was allowed to adhere to the female mold for 5.0 seconds to form a container. Subsequently, the vacuum•pressure air ports of the female mold were changed to pressure air to blow pressure air at 0.5 MPa, and the vacuum•pressure air ports of the male mold were changed to vacuum, and thereby, the container was allowed to adhere to the male mold for 5.0 seconds to cool it, and then, taken out. The molded article had good release ability from the mold, and was reproduced the mold shape completely without wrinkles and deformation. Moreover, fading and color change of printing ink did not occur, and the appearance was excellent in beautiful make-up properties.

<Crystallinity of Molded Articles>

A part of the bottom portion of the molded article was cut off, and its 10.0 mg was used as a sample. Each heat quantity was determined by a differential scanning calorimeter (Seico Electronics Industrial Co., Ltd. "DSC 220"), and the crystallinity was calculated based on the following formula. As the measuring conditions, the sample (10.0 mg) was measured with heating to elevate from 20° C. to 300° C. at a temperature elevation rate of 10° C./min while flowing nitrogen at 50 ml/min.

[Mathematical 2]
$$\text{crystallinity (\%)} = \frac{\text{heat quantity of fusion per mole} - \text{heat quantity of cold crystallization per mole}}{\text{heat quantity of fusion per mole of perfect crystal of PET (26.9 KJ)}} \times 100$$

The crystallinity was found to be 21.9%.

<Solid amount Contributing to Heat Resistance>

As mentioned previously, the crystal portion of PET and talc, which are solid, contribute to heat resistance by existing in the soft sea of the non-crystal portion of PET. Therefore, the existing amount influences the heat resistance.

[Mathematical 3]

content of talc=blended amount of MB×content of talc of MB=10%×70/100=7%

Accordingly, solid amount=crystallinity of PET+content of talc=21.9+7=28.9%

The crystallinity of PET is of the whole body of the molded article, and whereas, the content of talc is of only the main layer. However, since the heat resistance of the main layer mainly contributes to the heat resistance of the molded article, the heat resistance of the molded article can be judged by the total amount.

<Heat Resistance of Molded Article>

The molded article was placed in a temperature controlled dryer at 200° C., and allowed to stand for 20 minutes. The appearance was observed, and found to keep the original form before the test, without shrinkage, wrinkles and deformation. The crystallinity was measured by DSC, and found that the crystallinity was 21.9% before the test and 25.8% after the test. Therefore, it was considered that crystallization proceeded, and crystallinity was measured with time at 0 minute, after 10 minutes, 20 minutes and 30 minutes. The results are shown in Table 3.

TABLE 3

| standing Time (min) | 0 | 10 | 20 | 30 |
|---|---|---|---|---|
| crystallinity (%) | 21.9 | 23.4 | 25.6 | 27.9 |
| crystallinity (%) + content of talc (%) | 28.9 | 30.4 | 32.6 | 34.9 |

It is considered that crystallization proceeds with time passing to improve heat resistance.

<Cooking with Heat>

A commercial frozen gratin was placed in the molded container, and cooked with heat in an oven at 250° C. for 15 minutes. The gratin was cooked well. The contents were taken out, and after washing with water, deformation of the container and appearance of the inside PET resin layer were observed. As a result, it was found that deformation such as shrinkage and twist did not occur, and the inside PET resin layer did not vary at all.

After taking out the contents and washing with water, the crystallinity of the container was measured by DSC, and found to be 25.3% (crystallinity+content of talc=32.3%). Although heated at 250° C., it is considered that the container did not heated up to the temperature due to be in contact with the contents, and crystallization proceeded while passing through from 100° C. to 220° C. which are the optimum crystallization temperature, as shown in FIG. 5.

Example 2

[Preparation of Laminated Sheet]

A laminated sheet of main layer (300 μm)/inside layer (30 m) 330 μm in total thickness was prepared by the same apparatus and conditions as Example 1, except that a PET resin material composed of 84 parts by weight of PET resin (manufactured by Unitika Ltd., "MA-2101M", 1 part by weight of chain extender MB (Meisai kagaku Co., Ltd. Prototype), 10 parts by weight of talc MB (manufactured by Tokyo Printing Ink Mfg. Co., "PEX 1470"), 2 parts by weight of compatibilizer (manufactured by ARKEMA company, "LOTADER AX 8840") and 3 parts by weight of black pigment MB (Dainippon Ink and Chemicals, Inc., "BK-250 DCT", 70% of PET+30% of black pigment) was used for the main extruder, and PET resin (manufactured by Unitika Ltd., "MA-2101M") was used for the subsidiary extruder. In addition, a printed film was not laminated.

[Molding of Heat-Resistant Food Container]

Molding was carried out by using quite the same vacuum•pressure forming machine and mold as Example 1, and the male mold was set as a heating mold, and the female mold was set as a cooling mold. That is, the above laminated sheet was heated to be softened by a heater so that the surface temperature was made 130° C. The vacuum•pressure air ports of the male mold set at 170° C. was made vacuum, and the vacuum•pressure air ports of the female mold set at 70° C. was made pressure air to blow pressure air at 0.5 MPa, and thereby, the laminated sheet was allowed to adhere to the male mold for 5.0 seconds to form a container. Subsequently, the vacuum•pressure air ports of the female mold were set to vacuum, and the vacuum•pressure air ports of the male mold were set to pressure air to blow pressure air at 0.5 MPa to allow the container to adhere to the female mold to cool it, and then, the container was taken out. The molded article had good release ability from the mold, and was reproduced the mold shape completely without wrinkles and deformation.

<Crystallinity of Molded Article>

Similar to Example 1, a part of the bottom portion of the molded article was cut off, and its crystallinity was measured by DSC, and found to be 23.0%. Since 7% of the content of talc was added, $$\text{crystallinity of PET (\%)} + \text{content of talc (\%)} = 30.0\% \quad \text{[Mathematical 4]}$$

and therefore, it is considered to have sufficient heat resistance.

INDUSTRIAL APPLICABILITY

Since the food container of the invention can resist to the cooking temperature of 180-250° C., it can be utilized widely for food containers being possible to be cooked with heat.

DESCRIPTION OF REFERENCE SIGNS

10: Gravimetric/volumetric feeder
20: Mixer
30: Main extruder
31: Cylinder
33, 34: Vent hole
41: Cylinder
43, 44: Vent hole
60: T die
70: Cooling roll
80: Printed film delivery roll

The invention claimed is:

1. A heat-resistant food container which comprises a layer formed by adding a chain extender, a compatibilizer, and talc to polyethylene terephthalate (PET) resin, wherein an added amount of said talc is 2-15% by weight of PET, charging the mixture into an extruder having two or more vent holes, degassing under a condition where the PET resin is melted with heating by sucking at a high vacuum of −99.99 kPa or lower from the vent holes, thereafter, forming a sheet by extrusion molding, pressure-forming with vacuum the sheet by a thermoforming machine, and forming the container by keeping in a mold at 100-220° C., wherein said chain extender has three or more epoxy groups, wherein said compatibilizer is an ethylene/acrylic acid/glycidyl methacrylate copolymer, wherein the PET resin of the container has a crystal portion, the crystal portion being represented by the following formula:

$$\text{crystal portion (\%)} = \frac{\text{heat quantity of fusion per mole} - \text{heat quantity of cold crystallization per mole}}{\text{heat quantity of fusion per mole of perfect crystal of PET (26.9 KJ)}} \times 100, \quad \text{[Mathematical 1]}$$

and a total content of the talc and the crystal portion of the PET resin is 25% by weight or more in said container.

2. The heat-resistant food container as set forth in claim 1, wherein said added amount of said talc is 3-10% by weight of PET.

3. The heat-resistant food container as set forth in claim 1 or 2, wherein an inside layer being a PET resin layer is formed by coextrusion.

4. The heat-resistant food container as set forth in claim 1, wherein an outside layer being a printed film of an A-PET film or a stretched A-PET film 1.5-2.5 times in the MD direction provided with gravure printing is formed by thermal lamination.

5. The heat-resistant food container as set forth in claim 3, wherein an outside layer being a printed film of an A-PET film or a stretched A-PET film 1.5-2.5 times in the MD direction provided with gravure printing is formed by thermal lamination.

6. The heat-resistant food container as set forth in claim 1, wherein the talc has a mean particle size of 20 μm or less.

* * * * *